United States Patent [19]

Schwenzer et al.

[11] Patent Number: 4,693,434
[45] Date of Patent: Sep. 15, 1987

[54] SELF-DEPLOYING STABILIZING-VANE ASSEMBLY FOR PROJECTILE

[75] Inventors: Michael Schwenzer, Duesseldorf; Armin Eskam, Langenfeld; Walter Simon, Herzogenrath; Wilfried Becker, Duesseldorf, all of Fed. Rep. of Germany

[73] Assignee: Rheinmetall GmbH, Duesseldorf, Fed. Rep. of Germany

[21] Appl. No.: 779,228

[22] Filed: Sep. 23, 1985

[30] Foreign Application Priority Data

Sep. 22, 1984 [DE] Fed. Rep. of Germany ....... 3434879

[51] Int. Cl.$^4$ ............................................. F42B 13/32
[52] U.S. Cl. .................................... 244/328; 102/377; 403/2
[58] Field of Search ................... 244/3.26, 3.27, 3.28, 244/3.29, 3.23; 102/377, 378, 523, 293; 244/3.23; 411/2, 338, 339; 403/2; 220/201, 400

[56] References Cited

U.S. PATENT DOCUMENTS

| | | | |
|---|---|---|---|
| 1,849,728 | 3/1932 | Bachmann | 411/487 |
| 2,465,401 | 3/1949 | Skinner | 244/3.28 |
| 2,788,744 | 4/1957 | Donner | 102/523 |
| 3,100,448 | 8/1963 | Hablutzel | 102/523 |
| 3,633,456 | 1/1972 | Carr | 102/378 |
| 3,790,104 | 2/1974 | Jones | 244/3.28 |
| 4,073,401 | 2/1978 | Pecchenino | 220/201 |
| 4,106,875 | 8/1978 | Jewett | 102/378 |
| 4,440,360 | 4/1984 | Hallström | 244/3.28 |
| 4,444,115 | 4/1984 | Romer et al. | 102/523 |
| 4,561,181 | 12/1985 | Weisgerber | 411/339 |

FOREIGN PATENT DOCUMENTS 1950638 4/1971 Fed. Rep. of Germany .
2077399 10/1981 United Kingdom .

Primary Examiner—Deborah L. Kyle
Assistant Examiner—Michael Carone

[57] ABSTRACT

A vane assembly for a projectile has a carrier carrying a plurality of pivots, having at the pivots respective carrier elements, and adapted to be secured to an end of the projectile. Respective vane elements are each pivotal on the pivots between an inner position lying immediately adjacent the respective carrier element and within a projection of the projectile and an outer deployed position projecting beyond the projection. Respective heat-destructible pins engaged between the vane elements and the respective carrier elements normally retain the vanes in the inner position and release the vanes for movement into the outer position when destroyed by heat. The carrier element is a rib of the carrier against which the respective vane lies when not deployed. In addition, relative to a normal longitudinal direction of travel of the projectile carrying the assembly, the vanes extend longitudinally in the direction and have relative to the direction front leading ends engaging the respective pins and rear trailing ends at the respective pivots.

10 Claims, 8 Drawing Figures

SELF-DEPLOYING STABILIZING-VANE ASSEMBLY FOR PROJECTILE

FIELD OF THE INVENTION

The present invention relates to a self-deploying stabilizing-vane assembly for a projectile. More particularly this invention concerns such an assembly for use in a mortar grenade or the like.

BACKGROUND OF THE INVENTION

German patent document No. 3,048,941 filed Dec. 24, 1980 by F. Steck describes a mortar grenade having, as is standard, a hollow casing having a nose and a tail and filled with a charge that explodes when a concussion primer in the nose is detonated, that is when the grenade lands with great force on its nose end. The tail carries the propulsion charge and is provided with four stabilizer vanes that can pivot about respective axes angularly spaced about the longitudinal axis of the casing. Each of these vanes can pivot between a position lying flatly against the tail and in fact within the longitudinal axial extension of the main front part of the casing and a position projecting radially of the casing axis beyond the casing. Springs urge the vanes into the outer position and a cardboard retainer sleeve secures the vanes normally against this spring force in the inner positions. The vanes are in the inner position until the projectile leaves the muzzle of the barrel or tube from which it is shot, whereupon these vanes erect or deploy to the outer position in which they serve to stabilize the flight of the projectile through the air. On firing, the propulsion charge burns off the cardboard retainer, allowing the vanes to pivot out and thereby serve to stabilize the projectile in flight.

Such a system has the disadvantage that the space taken up by the sleeve cannot be filled with charge to maximize the explosive force of the projectile. This problem increases with high-speed projectiles with a muzzle velocity greater than 800 m/sec where the vanes are pivotal about axes lying in a plane perpendicular to the casing axis and all extending tangentially of a circle centered in this plane on the casing axis. Each vane in this high-speed system can rotate about the respective axis between an inner position pointing forward and recessed in a respective slot in the casing and an outer position projecting radially from the casing. The sleeve for such a high-velocity projectile must be fairly tough to withstand the considerable inertial forces it is subjected to, so that the propellant charge is generally reduced for such a grenade to thereby decrease its muzzle velocity to less than 600 m/sec, thereby gentling the sleeve and giving it time to burn off. The thicker sleeve in this system has the further disadvantage that it takes up even more valuable space, reducing the amount of charge the grenade can carry.

OBJECTS OF THE INVENTION

It is therefore an object of the present invention to provide an improved self-deploying stabilizing-vane assembly for a projectile.

Another object is the provision of such a self-deploying stabilizing-vane assembly for a projectile which overcomes the above-given disadvantages, that is which takes up little room yet that is even usable for high-velocity projectiles.

SUMMARY OF THE INVENTION

A vane assembly for a projectile according to the invention has a carrier carrying a plurality of pivots, having at the pivots respective carrier elements, and adapted to be secured to an end of the projectile. Respective vane elements are each pivotal on the pivots between an inner position lying immediately adjacent the respective carrier element and within an extension of the projectile and an outer deployed position projecting beyond the extension. Respective heat-destructible pins engaged between the vane elements and the respective carrier elements normally retain the vanes in the inner position and release the vanes for movement into the outer position when destroyed by heat.

These pins can therefore be very compact so as to waste very little volume in the projectile. At the same time they can provide very solid holding of the respective vanes while burning out rapidly when fired to allow them to deploy into the outer position.

The carrier element according to this invention is a rib of the carrier against which the respective vane lies when not deployed. In addition, relative to a normal longitudinal direction of travel of the projectile carrying the assembly, the vanes extend longitudinally in the direction and have relative to the direction front leading ends engaging the respective pins and rear trailing ends at the respective pivots.

In accordance with this invention for fastest burnout each pin is tubular. Furthermore, each pin is provided with means for fixing it in at least one of the respective elements. This means can be a heat-destructible adhesive between each pin and at least the respective one element. It can also be a tapered formation on the pin and a complementary tapered formation on the respective one element tightly receiving the respective pin formation. Thus the frustoconically tapered portion of the pin is force fitted in the respective vane element and/or carrier element. Thus the pin can fit in bores of the two respective elements, or in a bore of the carrier element. It is also possible for the pin to have one end with a rim bearing in one direction on one of the respective elements and at the opposite end a cap bearing in the opposite direction on the other element. The cap is secured on the pin by providing it with a radially outwardly projecting ridge on each cap and a radially inwardly opening groove on the respective pin resiliently receiving the respective ridge.

For speed-sensitive deployment of the vanes, they extend longitudinally in a normal longitudinal direction of travel of the projectile carrying the assembly and have relative to this direction front leading ends engaging the respective pins and rear trailing ends at the respective pivots. Each pivot defines a transverse axis and each vane has a center of mass radially further from a center axis of the projectile than the respective pivot axis.

DESCRIPTION OF THE DRAWING

The above and other features and advantages will become more readily apparent from the following, it being understood that any feature described with reference to one embodiment of the invention can be used where possible with any other embodiment. In the accompanying drawing.

SPECIFIC DESCRIPTION

Figure 1:
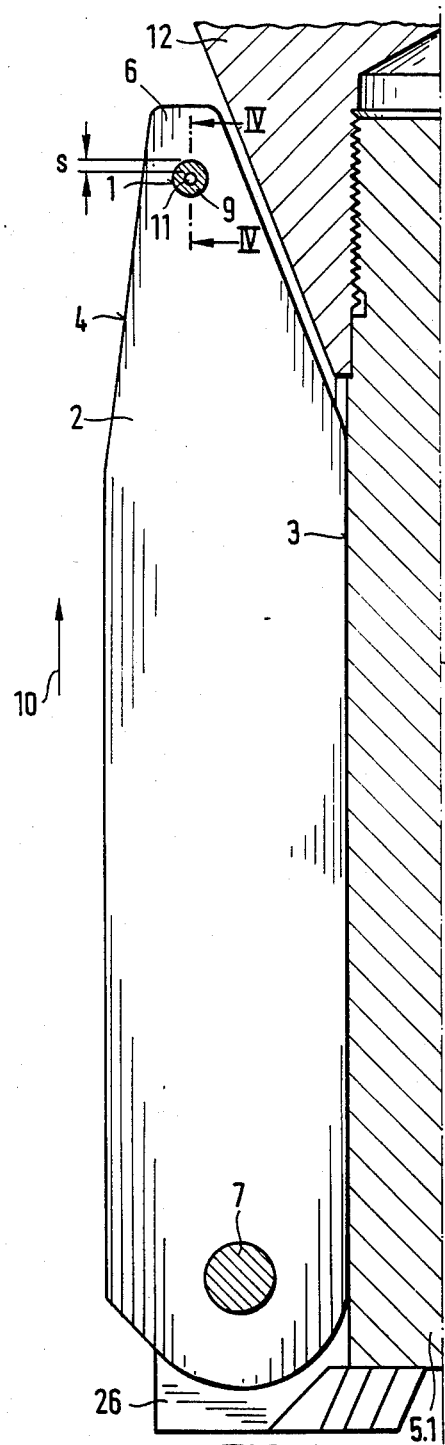
FIGS. 1 and 2 are axial sections through first and second stabilizing-vane assemblies according to this invention.

As seen in FIGS. 1, 2, 3, and 4, the vane assembly 10 according to this invention basically comprises a carrier 5 formed with a central shaft or stem 5.1 centered on an axis 28 and a plurality of flat ribs 5.2 extending radially of the axis 28 and angularly equispaced thereabout. The rear end of each rib 5.2 is provided with a transverse pivot pin 7 on which an elongated blade or vane 2 is pivoted to move in a respective plane including the axis 28. In the illustrated inner position the vanes 2 lie against the cylindrical outer surface 3 of the stem 5.1, which extends parallel to the axis 28 and to the normal direction 10 of displacement of the projectile. The outer edges 4 of these vanes 2 lie within the axially backward extension of a projectile or shell 12 to the rear end of which the stem 5.1 is screwed while an inner face 2.1 (FIG. 3) of each vane 2 is immediately juxtaposed with the outer face 5.3 of the respective vane 5.2. In this position the center C of mass of each vane 2 lies radially further from the axis 28 than the axis of the respective pivot 7, so that movement in the direction 10 will urge the vanes 2 radially outward with a force $P_H$ at their front upper ends 6.

Figure 4:
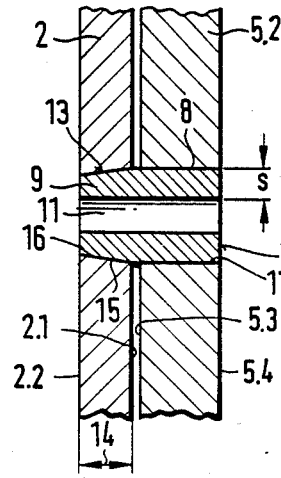

According to this invention as seen in FIGS. 1 and 4 each vane 2 is held in the inner position on the respective carrier rib 5.2 by a holder 1 constituted as a tubular pin 9 passing through a passage defined by bores 16 and 17 in the the vane 2 and the respective carrier rib 5.2. The pin 9 has an outer surface 8 provided with a holding formation 13 constituted as a frustoconical outer surface 15 complementarily fitting and wedged in the complementarily shaped bore 16 and of an axial length 14. The opposite end face 20 of the pin 9 is flush with the inner face 5.4 of the respective rib 5.2.

Figure 2:
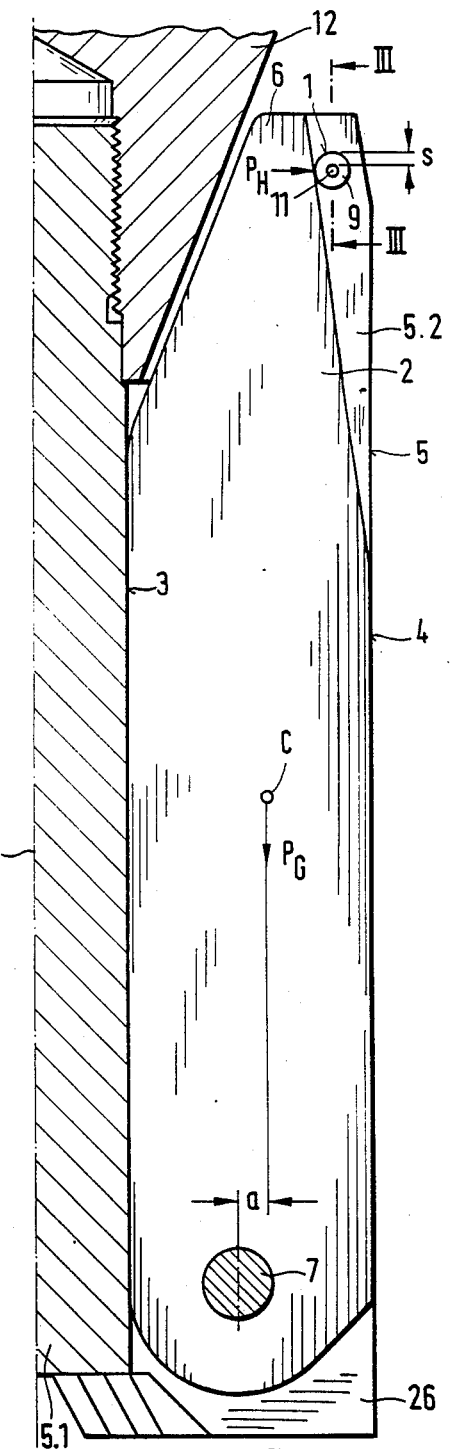
Figure 3:
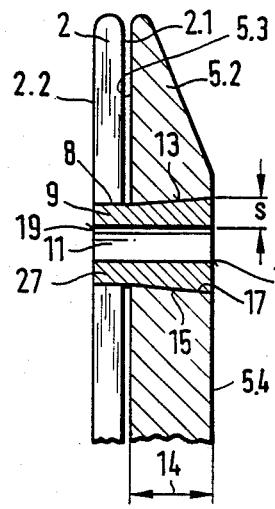
FIGS. 3 and 4 are large-scale sections taken along respective lines III—III and IV—IV of respective FIGS. 2 and 1.

In the arrangement of the FIGS. 2 and 3 the holding formation 13 is in the bore 17 which therefore has the complementary frustoconical surface 15 tapering, as in FIGS. 1 and 4, toward the vane 2 and force-fitted together. In addition in FIGS. 2 and 3 the pin 9 has an outer end 27 which is not seated in the vane 2, but which passes it axially, terminating at an outer face 19 flush with the outer face 2.2 of the respective vane 2, and lying in the path of its pivoting immediately adjacent the outer edge of the vane 2 at the front end. Thus in both cases the pins 9 normally hold the vanes 2 in the illustrated inner positions.

According to this invention each of the hollow pins 9 has a radial thickness s and is made of such a material such that it completely burns up by about the time the projectile leaves the barrel from which it is being shot. To this end these pins are made of so-called POL powder, that is explosive powder containing no solvent. Thus they can be made quite strong so as easily to withstand the force $P_H$, but still can fully burn out and release the respective vanes 2 when fired from a high velocity (<800 m/sec) tank cannon.

Figure 5:
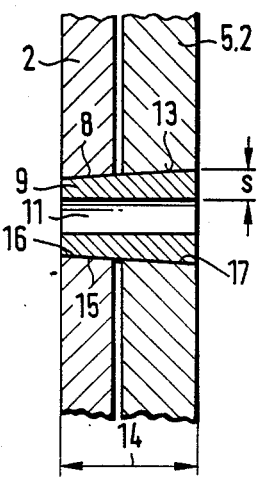
FIGS. 5 and 6 are sections like FIGS. 3 and 4 through third and fourth embodiments of this invention.

In the arrangement of FIG. 5 the holding formation 13 constituted by the frustoconical surface 15 extends the full length of the pin 9, to which end both bores 16 and 17 are of complementary frustoconical shape.

Figure 6:
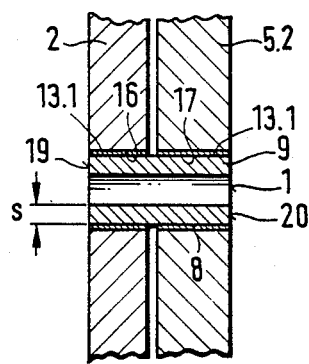

In FIG. 6 the holding formation 13 is replaced by an adhesive 13.1, for instance nitrolacquer, (a nitrolacquer is a solution of cellulose nitrate) and the pin 9 is of internal and external cylindrical shape. This adhesive can be provided in one or both of the bores 16 and 17, which are of complementary cylindrical shape.

Figure 7:
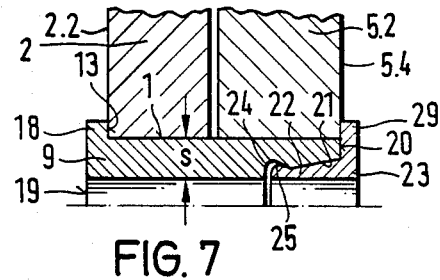
FIGS. 7 and 8 are partial sections through fifth and sixth assemblies in accordance with this invention.
Figure 8:
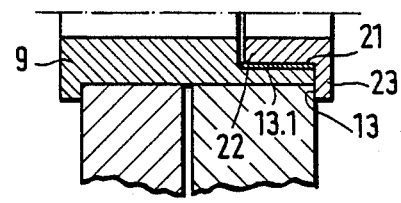

The system of FIGS. 7 and 8 has a cylindrically tubular pin 9 formed at its outer end with a rim 18 constituting a holding formation 13 that bears against the flat outer face 2.2 of the vane 2 and at the opposite end has another rim 29 that bears oppositely on the flat inner face 5.4 of the rib 5.2. The rim 29 is formed on a hollow cap 23 which in FIG. 7 has a frustoconical collar 22 fitting in a frustoconical cutout 21 of the pin 9, with a radially outwardly projecting ridge 25 on the inner end of the collar 22 fitting in a snap fit in a complementary inwardly open groove 24 of the pin 9. Thus the cap 23 can be snapped into the pin 2 to secure the vane 2 and rib 5.2 together.

In FIG. 8 the collar 22 is cylindrical and is secured in a cylindrical cutout 21 by means of the adhesive 13.1.

The system of this invention takes up very little space. Nonetheless it is capable of holding the vanes in place very solidly. The holding means 1 are heat destructible, that is they are destroyed—e.g. by burning or melting—when heated, yet until heated to the high temperatures they would encounter when fired they remain very strong and securely hold the respective vanes 2 in place. The space normally used to accommodate the sleeve is thus recovered for more effective use, and the problem of what happens to this sleeve, whether it is burnt up or just litters the shooting location, is also eliminated.

What is claimed is:

1. A vane assembly for a projectile which is to be fired from a gun barrel, the assembly comprising:
    a carrier carrying a plurality of pivots, having at the pivots respective vane elements which are adapted to be secured to an end of the projectile;
    each of said respective vane is pivotal on the pivots between an inner position lying immediately adjacent to said carrier and an outer deployed position projecting beyond the carrier; and
    means including respective heat-destructible tubular pins engaged between the vane elements and the carrier for normally retaining the vanes in the inner position and for releasing the vanes for movement into the outer position when destroyed by heat, said tubular pins being made of a combustible material which completely burns up about the time the projectile exits from the muzzle of the gun barrel.

2. The vane assembly defined in claim 1 wherein the vane element is a rib of said carrier.

3. The vane assembly defined in claim 1 wherein, relative to a normal longitudinal direction of travel of the projectile carrying the assembly, the vane elements extend longitudinally in the direction and have relative to the direction front leading ends engaging the respective pins and rear trailing ends at the respective pivots.

4. The vane assembly defined in claim 1 wherein, relative to normal longitudinal direction of travel of the projectile carrying assembly, the vane element extend longitudinally in the direction and have relative to the direction front leading ends engaging the respective pins and rear trailing ends at the respective pivots, each pivot defining a transverse axis and each vane element having a center of mass radially further from a center axis of the projectile than the respective pivot axis.

5. The vane assembly defined in claim 1 wherein the vanes extend axially forward in the inner positions and have relative to the normal axial projectile-travel direction front leading ends engaging the respective pins and rear trailing ends at the respective pivots.

6. The vane assembly defined in claim 1 wherein the pin has one end with a rim bearing in one direction on an element selected from either said vane or said carrier and at the opposite end a cap bearing in the opposite direction on the other element, and the pin is provided with means for securing the cap on the pin.

7. The vane assembly defined in claim 6 wherein the securing means is a radially outwardly projecting ridge on each cap and a radially inwardly opening groove on the respective pin resiliently receiving the respective ridge.

8. The vane assembly defined in claim 1 wherein each pin is provided with means for fixing it in at least one of the respective elements.

9. The vane assembly defined in claim 8 wherein the fixing means is a heat-destructible adhesive between each pin and at least the respective one element.

10. The vane assembly defined in claim 8 wherein the fixing means is a tapered formation on the pin and a complementary tapered formation on the respective one element tightly receiving the respective pin formation.

* * * * *